B. M. STEELE.
AGRICULTURAL IMPLEMENT.
APPLICATION FILED OCT. 29, 1915.
1,226,920.
Patented May 22, 1917.
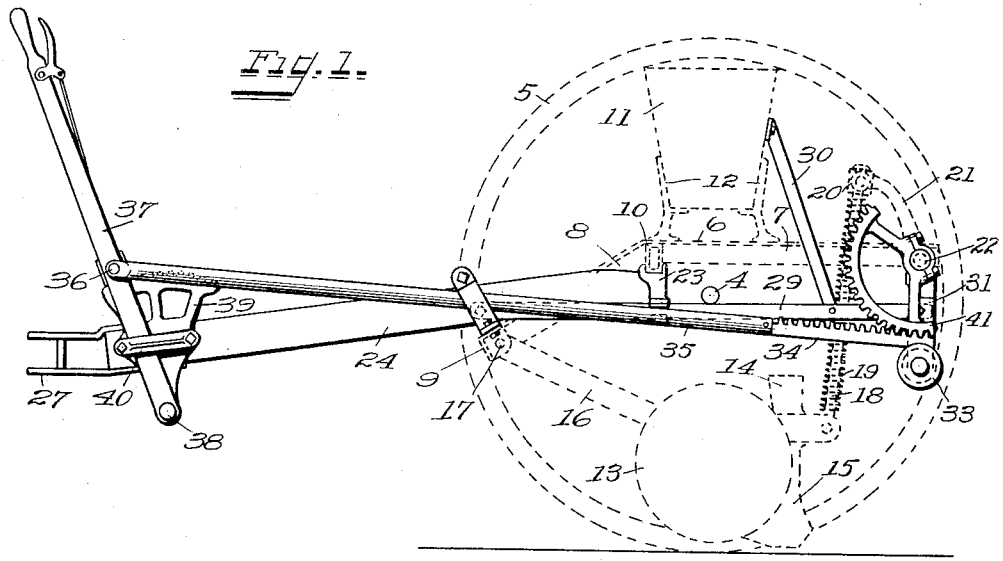
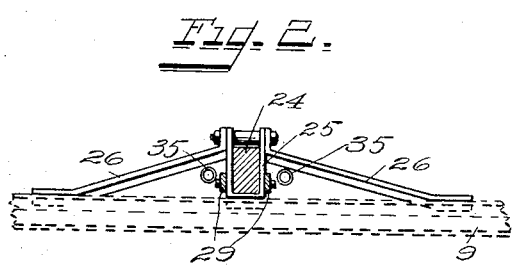
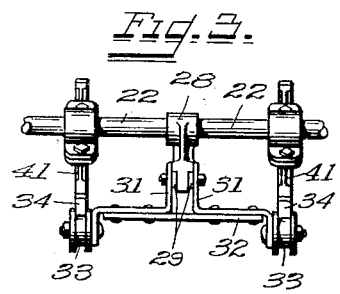
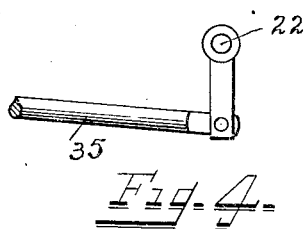
Inventor.
Benjamin M. Steele
LaPorte & Bell
Attys.

UNITED STATES PATENT OFFICE.

BENJAMIN M. STEELE, OF PEORIA, ILLINOIS, ASSIGNOR TO PEORIA DRILL AND SEEDER CO., OF PEORIA, ILLINOIS, A CORPORATION OF ILLINOIS.

AGRICULTURAL IMPLEMENT.

1,226,920.    Specification of Letters Patent.    Patented May 22, 1917.

Application filed October 29, 1915. Serial No. 58,550.

*To all whom it may concern:*

Be it known that I, BENJAMIN M. STEELE, a citizen of the United States, a resident of Peoria, in the county of Peoria and State of Illinois, have invented new and useful Improvements in Agricultural Implements, of which the following is a specification.

This invention has reference to improvements in agricultural implements having soil engaging elements, which are adapted to be raised from, and lowered into the soil for forming furrows, or otherwise operating thereupon.

More specifically, the invention has reference to the means for raising and lowering said soil engaging elements, from the platform of a tractor, or other motor propelled device, to which the implement is attached and by means of which it is drawn over the ground.

My invention is preferably shown, in this instance, as applied to grain drills, the soil engaging elements of which, include a boot having a runner, also a disk; the disk and boot with its runner connected with a drawbar pivotally attached to the implement frame. The disk and runner of the boot are adapted to be raised and lowered by means of a rock shaft, and connections between the rock shaft and said boot.

It is to be understood that my invention, when applied to a grain drill, is not concerned with the number of disks, or boots and runners, nor whether they are arranged in a single series or in gangs, and that it is also immaterial whether there are disks associated with the runners of the boots.

Heretofore, so far as applicant is aware, the means for operating the rock shafts of grain drills has been located at the rear of the machine within easy and convenient reach of the operator driving the animals drawing the implement over the field. The use of a tractor or other motor propelled device for drawing the grain drill over the field makes it necessary to operate the rock shaft, for raising and lowering the ground engaging elements, from the tractor; otherwise, the operator must leave the tractor and walk back of the machine to reach the operating means, or a helper must be employed, whose duty it will be to perform this service. With my invention, the helper is not needed and the operator may control the ground engaging elements from the tractor, or other device.

In the drawings,—

Figure 1 shows my invention applied to a grain drill, those parts of the device now in common use being shown in dotted lines, whereas, the parts embodying the invention are shown in full lines, and Figs. 2 and 3 show details of parts illustrated in Fig. 1; and Fig. 4 shows a modified form of connection between the rock-shaft and the operating rod.

Like characters of reference denote corresponding parts on the drawings.

4 designates the axle on which the ground wheels 5 are carried. 6 represents one of the side rails forming the frame, having the substantially horizontal portion 7 and the forwardly inclined portion 8. 9 is an angle bar extending cross-wise of the front of the frame and connects the side rails, and 10 is a channel brace connecting the side rails and for supporting parts of the machine. The seed box 11 is supported by brackets 12 connected with the side rails.

The ground engaging elements comprise the disk 13, and the boot 14 having the runner 15. The disk and boot with its runner are suitably connected with a draw bar 16, and said draw bar at its upper outer end has a pivotal connection at 17 with the angle bar 9, whereby, the disk and boot with its runner may be raised and lowered. To the rear end of the draw bar 16 there is connected a rod 18 about which is coiled a spring 19. Connected to a collar 20 slidable on the upper end of the rod 18 is an arm 21 secured to a rock shaft 22 journaled in suitable bearings carried on the side rails 6. When the rock shaft 22 is rocked forwardly in its bearings, the arm 21 is lowered causing the collar 20 to bear down on the spring 19 and thus yieldingly depress the runner 15 and the disk 13 into the soil. Rotating the rock shaft 22 in an opposite direction will lift the arm 21 and cause the collar 20 to bear adjacent a suitable shoulder on the rod 18 and lift the rod, disk and boot. It is understood that a single series of disks and boots may be used, each having a connection with the rock shaft, as explained, or the disk and boots arranged in gangs, each gang connected with a rock shaft.

The feeding means between the seeding hopper 11 and the boot 14 has been omitted, as it may be of any general construction, as is well understood.

23 designates a bracket or hanger secured to the brace 10. To this bracket or hanger is secured the inner end of the tongue 24 for the implement, said tongue extending forwardly of the implement and across the angle bar 9, being held in a chair 25 secured to the bar 9. Braces 26, secured to the chair 25 extend in opposite directions and are secured to the bar 9, see Fig. 2. To the forward end of the tongue 24 is secured a clevis, or some similar device 27, by means of which the implement may be attached to a suitable tractor, not shown, or some other suitable motor propelled device, for drawing the implement over the field, and from place to place.

Fig. 3 shows two rock shafts 22, and therefore operating means for each is employed, the inner ends of the rock shafts being journaled in a bracket 28. To opposite sides of the bracket 28 are secured the rear ends of brace bars 29 which extend forwardly of the implement and have their outer ends secured to the chair 25. Other brace bars 30 are secured to the brace bars 29, which extend upwardly and are secured to the seed box 11.

Hanger bars 31 are secured to the bracket 28, and said bars 31 are braced by a bar 32, secured thereto. On each hanger bar 31 is journaled a flanged roller 33, and movable on each roller 33 is a rack bar 34 which is guided by the flanges of the roller. The forward end of each rack bar 34 is connected with a rod 35, each rod extending forwardly of the implement across the bar 9 and pivotally connected at 36 with a lever 37, and said levers are pivoted at 38 to a quadrant 39 secured to the forward end of the tongue 24. To each lever 37 is connected the usual spring bolt and operating means, the spring bolt adapted to engage with the teeth of the quadrant. A strap bar 40 limits the movement of each lever. In Fig. 1, only one lever and one quadrant is shown, but it is understood that there is a similar quadrant and lever on the opposite sides of the tongue 24.

To each rock shaft 22 is secured the segment gear 41, each gear being in mesh with a rack bar 34, and when moved by such rack bar will rock the shaft 22 in its bearings to lift or lower the arms 21.

It is obvious that the segment gear connection between the rock-shaft 22 and the rack bar 34 provides a rigid operating connection between the actuating means for the ground engaging elements and said last mentioned elements to hold them firmly in their adjusted working positions, and that the bars 35 extending forwardly approximately horizontally of the implement form a rigid operating means facilitating in the easy operation of the means for raising and lowering the ground engaging elements.

Assuming now that the implement is attached to a tractor or other motor propelled device, and the operator standing on the platform of such motor propelled device, desires to depress the ground engaging elements of one or both gangs, by releasing the spring bolt from the quadrant, he may move one or both levers 37, to the right, looking at Fig. 1, causing the rack bar or bars 34 to rotate the gear or gears 41, rocking the shaft or shafts 22 and depressing the arms 21, which in turn, through the connections described, cause the disks and runners to enter the soil. Reversing the operation just described will cause the disks and runners to be raised to the position shown in Fig. 1. Instead of the rack and gear connection shown between the operating rod and the rock shaft 22, I may use the connection shown in Fig. 4 which consists in providing an arm 42 depending from the shaft 22 and pivotally connected as at 43 to the end of the operating rod 35.

What I claim is:

1. In combination, in a grain drill, means for attaching the drill to a tractor, means for raising and lowering the soil engaging elements of the drill, mechanism for operating said raising and lowering means, including means having a rigid operative connection for holding the soil engaging elements to their work, and including also approximately horizontally disposed rigid elements which extend from a position in the rear of said soil engaging elements to a position considerably forward of said soil engaging elements, and means for operating said last mentioned elements and for holding the same in adjusted positions, said operating means being located to be actuated by the tractor operator.

2. In combination, in a grain drill, a tongue having a length sufficient to permit the drill to be attached to a tractor without interference between the drill and tractor, when turning, means for raising and lowering the soil engaging elements of the drill, rigid elements disposed approximately horizontally of the drill and extending from front to rear thereof, operating connections between said rigid elements and said raising and lowering means, said last mentioned connections being of a rigid character to hold the soil engaging elements to their work, a lever and locking means therefor in operative connection with the forward portions of said horizontally disposed rigid elements for operating the same and for locking the same in adjusted positions, said lever being located to be actuated by the tractor operator.

BENJAMIN M. STEELE.

Copies of this patent may be obtained for five cents each, by addressing the "Commissioner of Patents, Washington, D. C."